United States Patent [19]

Kogiso et al.

[11] Patent Number: 4,897,992

[45] Date of Patent: Feb. 6, 1990

[54] METHOD AND APPARATUS FOR TRANSPORTING ROVING BOBBINS IN A SPINNING FACTORY

[75] Inventors: Takashi Kogiso, Mizunami; Yoshio Kurachi, Aichi, both of Japan

[73] Assignee: Howa Machinery, Ltd., Aichi, Japan

[21] Appl. No.: 237,135

[22] Filed: Aug. 26, 1988

[30] Foreign Application Priority Data

Aug. 29, 1987 [JP] Japan ................................ 62-216049

[51] Int. Cl.⁴ .............................................. D01H 9/18
[52] U.S. Cl. .................................... 57/281; 198/487.1
[58] Field of Search ................ 57/264, 266, 267, 281; 242/35.5 R, 35.5 A; 198/432, 468.2, 487.1, 803.12

[56] References Cited

U.S. PATENT DOCUMENTS

| | | | |
|---|---|---|---|
| 3,447,707 | 6/1969 | Furst | 57/281 X |
| 3,721,081 | 3/1973 | Ishida | 57/281 |
| 3,828,682 | 8/1974 | Klein | 57/281 X |
| 3,935,821 | 2/1976 | Maier et al. | 57/281 X |
| 4,181,228 | 1/1980 | Hashimoto et al. | 242/35.5 A X |
| 4,369,621 | 1/1983 | Kogiso | 57/274 X |
| 4,683,713 | 8/1987 | Matsui et al. | 242/35.5 R X |
| 4,724,666 | 2/1988 | Küpper | 57/281 |
| 4,736,581 | 4/1988 | Uchida | 57/281 |
| 4,776,468 | 10/1988 | Kiriake | 242/35.5 A X |

FOREIGN PATENT DOCUMENTS

| | | | |
|---|---|---|---|
| 3405186 | 5/1985 | Fed. Rep. of Germany | 57/281 |
| 139978 | 8/1983 | Japan | 242/35.5 A |
| 2062931 | 3/1987 | Japan | 242/35.5 A |
| 2062932 | 3/1987 | Japan | 242/35.5 A |
| 2062933 | 3/1987 | Japan | 242/35.5 A |
| 263333 | 11/1987 | Japan | 57/281 |

Primary Examiner—Joseph J. Hail, III
Attorney, Agent, or Firm—Michael N. Meller

[57] ABSTRACT

A method and apparatus for transporting roving bobbins in a spinning factory utilizing a factory building having several floors for the installation of spinning machines such as roving frames and ring spinning frames, between specified positions on a floor where roving frames are installed and positions for carrying out a roving bobbin exchanging operation for ring spinning frames, wherein a guide rail system for displaying a plurality of bobbin carriers provided with a plurality of bobbin hangers is suspended from the ceiling of the floor on which the ring spinning frames are installed and transporting passages, provided with apparatus for displacing a plurality of pairs of roving bobbins by successive unit cycle operations composed of a first upwards displacing operation and a second downwards displacing operation, is arranged between each of the above-mentioned specified positions and a corresponding transfer position for the bobbin carriages at which the roving bobbins can be transferred thereto and therefrom at the uppermost position thereof, and capable of transferring roving bobbins between the above-mentioned specified position and the displacing means at the lowermost position of the transporting passage.

15 Claims, 10 Drawing Sheets

METHOD AND APPARATUS FOR TRANSPORTING ROVING BOBBINS IN A SPINNING FACTORY

BACKGROUND OF THE INVENTION

Description of the Related Art

Where spinning machines such as roving frames and ring spinning frames are installed in a factory-building having a single floor or several floors, when full packaged roving bobbins are to be transported to positions adjacent to the ring spinning frames, usually a transporting system is used whereby full packaged roving bobbins doffed from respective roving frames are placed in transporting carriers which are moved along the floor and delivered to a position allocated for receiving them. If the roving frames and the ring spinning frames are installed on different floors, the transporting carriers are moved from one floor to the other by an elevator, and the full packaged roving bobbins are then taken out of the transporting carriers and mounted on the creel of the ring spinning frame concerned, by utilizing bobbin hangers from which the full packaged roving bobbins are suspended.

As is well known in this field, when such a transporting system is used, there is a considerable possibility of damage occurring to the outside layers of the full packaged roving bobbins, due to frictional contact of the full packaged rovings bobbins with other full packaged roving bobbins or with the inside wall of the carrier, and further, this transporting system incurs manual operating costs. To alleviate the disadvantages of the above-mentioned transporting system, an improved transporting carrier was disclosed in Japanese Examined Patent Publication Showa No. 54 (1979)-44786. Nevertheless, this transporting carrier has a complicated construction, and thus is more expensive to manufacture, and still requires manual operation. Therefore the above-mentioned problems cannot be solved by adopting this type of transporting carrier.

To fundamentally solve the above-mentioned problems, a unique apparatus for doffing full packaged roving bobbins from a roving frame and transporting doffed full packaged roving bobbins to positions for carrying out the roving bobbin changing operation for a ring spinning frame was proposed in Japanese Unexamined Patent Publication Showa No. 61 (1986)-201029, which corresponds to U.S. Pat. No. 4,369,621, by the applicant of the present application. In the apparatus of this invention, each roving frame is provided with an automatic doffing apparatus by which all full packaged roving bobbins are simultaneously doffed from the roving frame and received by respective pegs on a conveyor belt arranged at an adjacent position in front of the alignment of the flyers, and a holding plate provided with a pair of pegs for temporarily holding the full packaged roving bobbins is displaced upwards from the discharging end portion of a conveyor belt of the doffing apparatus to the above-mentioned bobbin hangers of the bobbin carriage, which can be displaced along a guide rail system suspended from the ceiling of the floor on which the ring spinning frames are installed. After the full packaged roving bobbins are transferred from the pegs of the holding plate to the corresponding bobbin hangers of the bobbin carriage, the holding plate is displaced downwards to be returned to the lowermost position thereof at which the above-mentioned transfer of the full packaged roving bobbins from the conveyor belt of the automatic doffing apparatus to the holding plate is carried out. Accordingly, it takes a long time to complete the transfer of all of the full packaged roving bobbins doffed from a roving frame to the respective bobbin hangers of the bobbin carriage, and since this type of roving frame starts a normal spinning operation as soon as the automatic doffing operation is completed, the following problems arise. Namely, since it is impossible to eliminate the roving piecing operation for a certain spinning unit of the flyers, if the full packaged roving bobbins are still on the conveyor belt at the time when the above-mentioned piecing operation must be carried out before starting the normal spinning operation of the roving frame, these full packaged roving bobbins hinder the smooth start to the operation of the roving frame, particularly, since a quick start of the spinning operation is usually required. Accordingly, the speed of the operation of transferring all of the full packaged roving bobbins from the conveyor belt of the automatic doffing apparatus to the bobbin hangers of the bobbin carriage by the above-mentioned proposed system must be increased, particularly when several floors, i.e., more than three floors, are utilized in such a factory.

SUMMARY OF THE INVENTION

To solve the above-mentioned problems, in the present invention, a unique technical concept of increasing the capacity of the transport for the roving bobbins from the floor on which the roving frames are installed to the respective positions where the roving bobbin exchanging operation is performed for the ring spinning requiring this operation, and vice versa, is applied. Namely, in the present invention a plurality of bobbin carriages provided with a plurality of bobbin hangers for suspending roving bobbins thereon, a guide rail system arranged for displacing these bobbin carriages to positions at which the roving bobbin exchanging operation must be carried out, and a unique mechanism for transporting roving bobbins between a specified position, such as the discharge end of a conveyor belt of the automatic doffing apparatus attached to each roving frame, to bobbin carriages waiting at a receiving or discharging position on the guide rail system are provided. Particularly, the lifting mechanism has a very large capacity for transporting roving bobbins, in spite of a very simple construction. The unique technical concept for increasing the transporting capacity in accordance with the invention is embodied by a transportation passage for displacing a plurality of pairs of roving bobbins simultaneously between the above-mentioned two positions, by utilizing pegs for temporarily holding roving bobbins, through an aperture or apertures formed on the respective floor constructions, attain the purpose of this invention.

In this system of transporting roving bobbins, a plurality of pairs of pegs are displaced simultaneously by successive unit cycle operations, each unit cycle operation being composed of a first unit displacement of these pegs and a second unit displacement of these pegs in a direction opposite to that of the first unit displacement, whereby the transfer of the roving bobbins between the bobbin carriage and these pegs is accomplished as a result of a combination of these first and second unit displacements of the pegs, i.e., the displacement of the roving bobbins towards or away from the bobbin carriage is a result of a subtraction of the distance of the first unit displacement from that of the second unit displacement of these pegs, and each time the above-mentioned successive stepwise unit cycle operations are carried out, a pair of roving bobbins are transferred between the bobbin carriage and the pegs at the uppermost position in the transporting passage, and a pair of roving bobbins are transferred between the pegs at the lowermost position in the transporting passage and the specified position on the floor on which the roving frames are installed, whereby a large-capacity transporting system, which is the object of the present invention, is obtained.

PREFERRED EMBODIMENT OF THE PRESENT INVENTION

Figure 4:
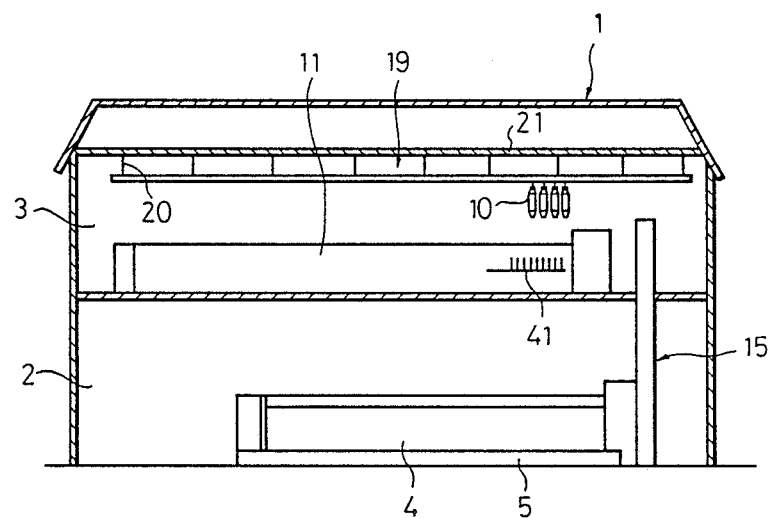
FIG. 4 is a schematic sectional view of a spinning factory to which the present invention is applied, where the first floor is utilized for the installation of roving frames, and the second floor is utilized for the installation of ring spinning frames.

To clarify the characteristic features of the present invention, the most typical embodiment of the present invention is hereinafter explained in detail. This embodiment is an application of the present invention to a spinning factory utilizing two floors of a building, wherein roving frames are installed on the first floor and ring spinning frames are installed on the second floor. As shown in FIG. 4, in this embodiment of the present invention each roving frame is provided with an automatic doffing apparatus 5, but the present invention can be effectively applied to spinning factories utilizing a several floors of building, i.e., three or four floors, and further, to a spinning factory utilizing one floor of a building on which roving frames and ring spinning frames are installed.

Figure 7:
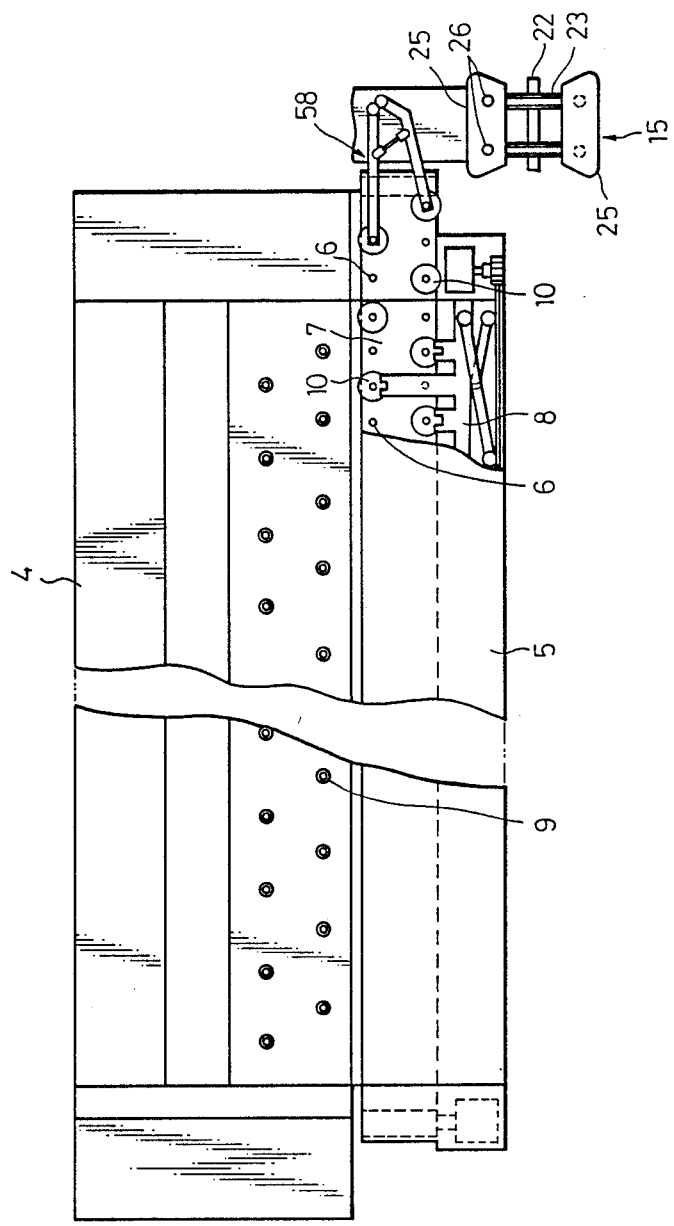
FIG. 7 is a schematic plan view indicating a roving frame in relation to a lifting mechanism, which is a main part of the apparatus according to the present invention.

The automatic doffing apparatus utilized for this embodiment is a known apparatus disclosed in U.S. Pat. No. 4,369,621, but other automatic doffing apparatus have been developed and can be utilized for the purpose of the present invention. As shown in FIG. 7, the automatic doffing apparatus applied for this embodiment is provided with an endless belt conveyor 7 having a plurality of pegs 6 arranged thereon, and a doffing head 8 which functions to doff full packaged roving bobbins 10 from the bobbin wheels 9 of the roving frame 4 and then transfer those bobbins to the corresponding pegs 6 of the belt conveyer, by a forward and rearward motion and upward and downward motion thereof, and which functions to take fresh bobbins temporarily held by the other pegs 6 of the belt conveyer 7 and transfer those bobbins to the bobbin wheels 9, from which the full packaged roving bobbins 10 had been doffed by the immediately previous motion thereof, by a motion similar to the above-mentioned doffing motion.

Figure 6:
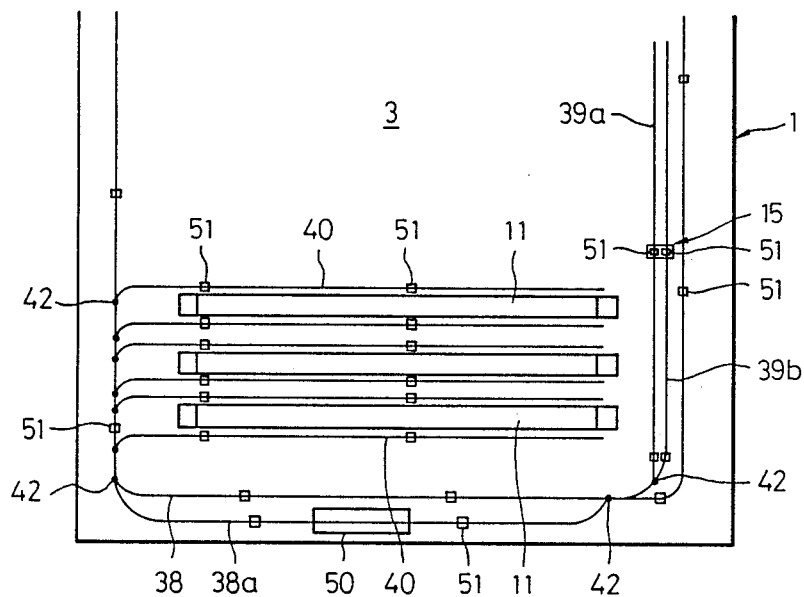
FIG. 6 is a schematic drawing indicating the arrangement of ring spinning frames in relation to the arrangement of a guide rail system for displacing bobbin carriages according to the present invention.

As shown in FIG. 6, a plurality of ring spinning frames 11 are installed in parallel on the the second floor of a spinning factory, wherein each spinning frame is provided with a creel 12 at each side and along the spindle alignment thereof. The creel 12 is provided with two rows of bobbin hangers 13 arranged such that each pair of a front bobbin hanger and a back bobbin hanger, facing each other, take positions facing the corresponding positions of two adjacent spindles of the spindle alignment of the spinning frame, respectively, so that rovings can be fed from roving bobbins 10 held by the pair of front and back bobbin hangers 13 to the corresponding two adjacent spindles of the spindle alignment of the spinning frame.

Next, the roving bobbin transferring method and apparatus according to the present invention, by which the full packaged roving bobbins 10 doffed from the roving frames 4 are transferred to the ring spinning frame 11, are explained in detail.

Figure 1:
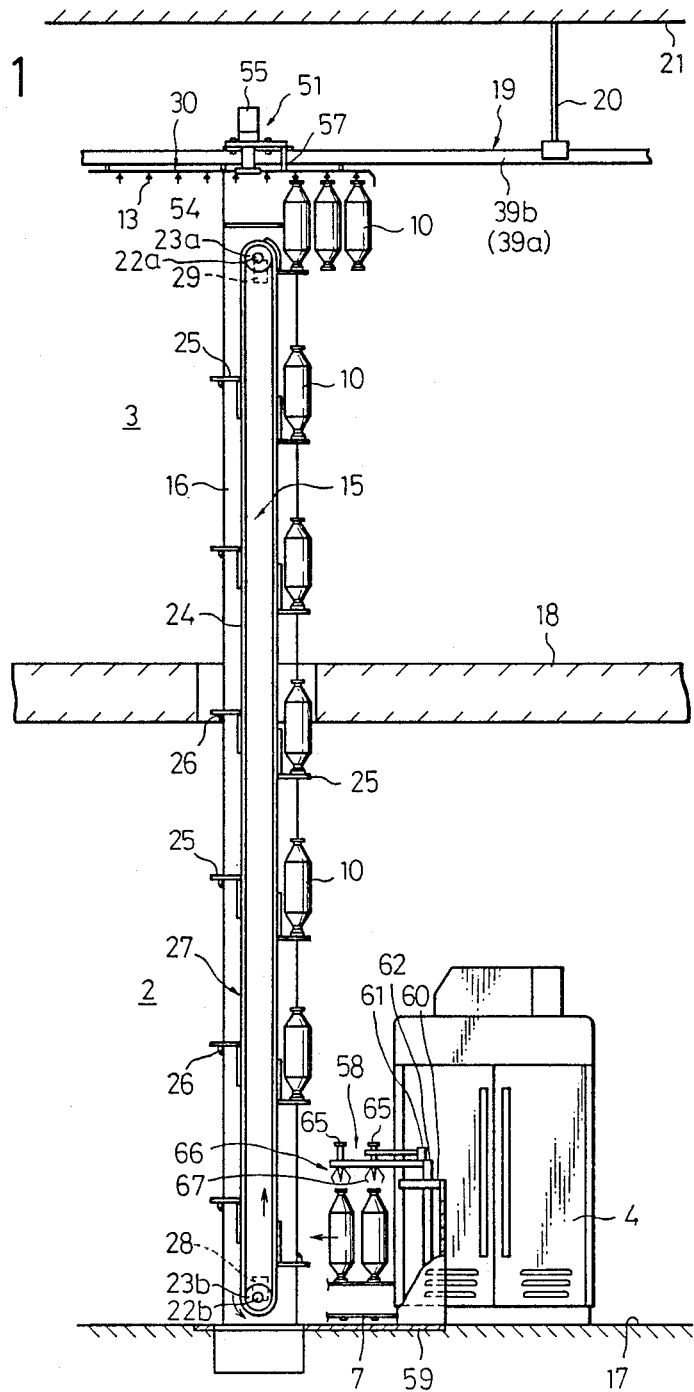
FIG. 1 is a schematic explanatory drawing of the main part of the roving bobbin transferring apparatus, viewed from one side of a roving frame, according to the present invention.
Figure 8:
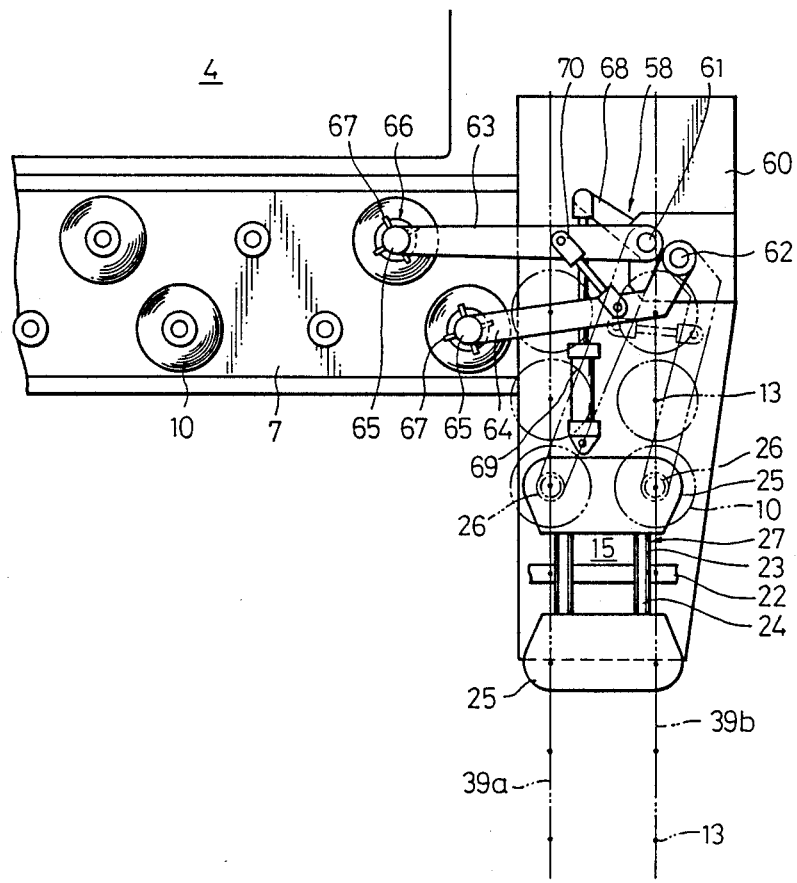
FIG. 8 is an enlarged drawing of a main part of the plan view of FIG. 7.

For a better understanding of the present invention, the construction and function of the roving bobbin transporting apparatus according to the present invention is first explained in detail. As shown in FIG. 1, the lifting mechanism 15, which is the main component of the apparatus according to the present invention, is disposed at a position approximately adjacent to a discharging end portion of the belt conveyor 7 of the automatic doffing apparatus 5. The lifting mechanism 15 is provided with an elevator case 16, having a vertical hollow space extended from the floor level to a top plate thereof. The elevator case 16 is extended from the floor 17 of the first floor 2 to a position connected to the passage of the bobbin carriages 13, which can be displaced along the corresponding guide rails 39a, 39b of a guide rail system 19, while passing through an opened space formed in the floor 17 of the second floor 3, on which the ring spinning frames are installed. Namely, the upper end portion of the elevator case 16 is secured to the guide rails 39a, 39b of the guide rail system 19. The guide rail system 19 is suspended from a ceiling of the building by suspension members 20. An upper shaft 22a and a lower shaft 22b are mounted at the upper end and lower end portions of the elevator case 16, respectively, an upper chain wheel 23a and a lower chain wheel 23b are rotatably mounted at the upper and lower shafts 22a, and 22b respectively, and an endless chain 24 is mounted on chain wheels 23a and 23b in such a manner that the chain 24 is moved by the rotation of the chain wheels 23a, 23b. A plurality of roving bobbin holding plates 25 are secured to the endless chain conveyor 27 such that, when these holding plates 25 are displaced upward or downward when driven by the chain conveyor 24, each holding plate 25 is maintained in a horizontal plane, by means of an attachment (not shown). Each holding plate 25 is provided with a pair of pegs 26 for temporarily holding roving bobbins, respectively, and a drive motor (not shown) is disposed at the bottom portion of the lifting mechanism 15 to drive the lower shaft 23b in a normal direction to displace each holding plate 25 upward and in a direction opposite to this normal direction. As shown in FIG. 1, a pair of limit switches 28 and 29 are arranged at the lifting mechanism 15 to control the unit driving operation of the chain wheel 23b, composed of a first drive in the normal direction and a second successive drive in the opposite direction, to carry out the roving bobbin transfer operation from each holding plate 25 at the uppermost position, facing two bobbin hangers 13 of the respective bobbin carriages 30 carried to the transfer position on the corresponding guide rails 39a, 39b of the guide rail system 19, and simultaneously, to carry out the roving bobbin transfer operation from the belt conveyor 7 to the holding plate 25, by a roving bobbin transfer device 58 (FIGS. 7, 8). The distance between two adjacent holding plates 25 is made such that a simultaneous carrying out of the above-mentioned roving bobbin transfer operation from the holding plate 25 to the bobbin hangers 13 of the respective bobbin carriages 30, and from the belt conveyor 7 to the holding plate 25 by the roving bobbin transfer device 58 (FIGS. 7, 8) can be accomplished. Accordingly, the lifting mechanism 15 of this embodiment comprises the elevator case 16, the chain wheels 23a and 23b, the holding plates 25, the limit switches 28 and 29, and the drive motor.

Therefore, in this embodiment of the present invention, it is essential to satisfy a condition such that the distance between the longitudinal center lines of the two guide rails 39a, 39b is identical to the axial distance between two pegs 26 of each holding plate 25 of the lifting mechanism 15.

Figure 5:
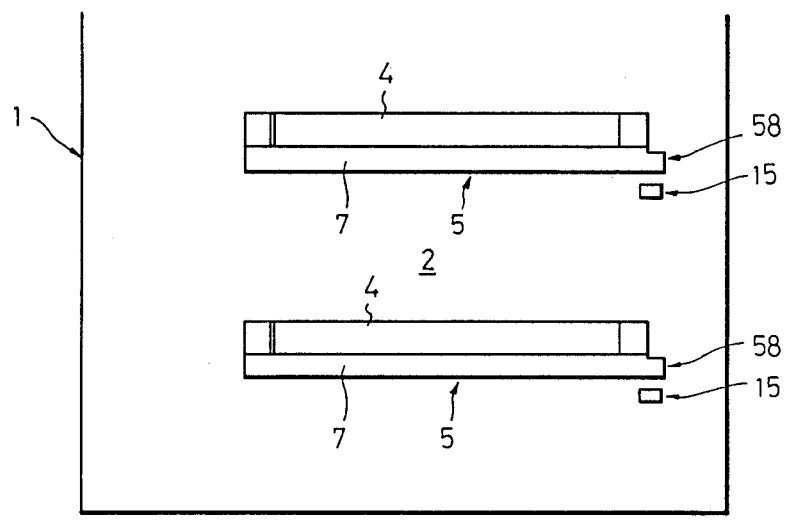
FIG. 5 is a plan view of a part of the floor utilized for roving frames, of the spinning factory shown in FIG. 4.

Next, the guide rail system 19, which functions to displace the bobbin carriages 30 from the transfer position facing the lifting mechanisms 15 to the positions whereat the roving bobbin exchanging operation between the ring spinning frames 11 and the corresponding bobbin carriages 30, and vice versa, is carried out, is explained hereinafter in detail with reference to FIGS. 4, 5, and 6.

Figure 9:
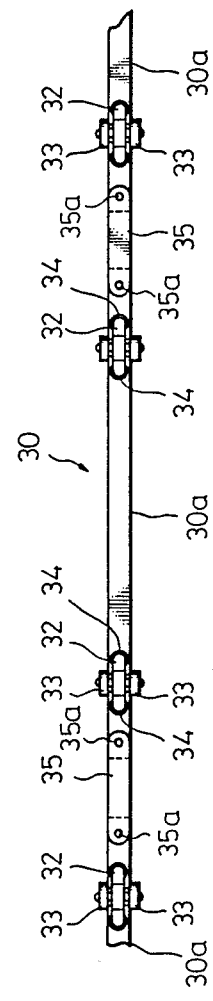
FIG. 9 is a partial plan view of a bobbin carriage, which is a component of the apparatus according to the present invention.
Figure 10:
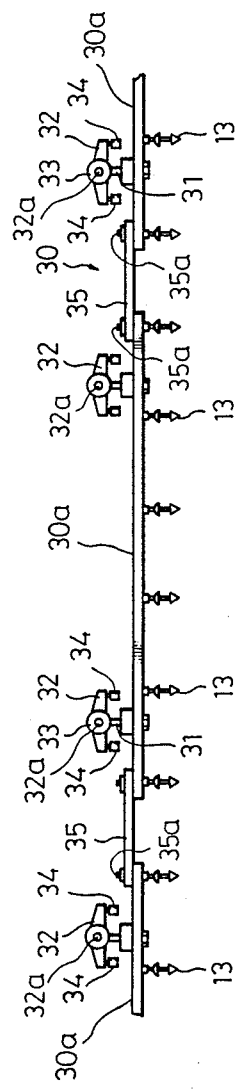
FIG. 10 is a side view of the bobbin carriage shown in FIG. 9.
Figure 12:
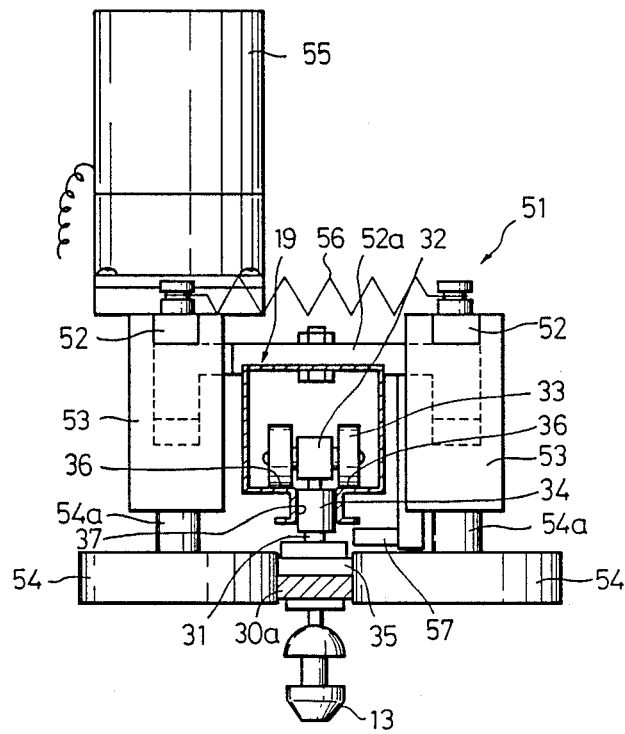
FIG. 12 is a cross-sectional view of the displacing mechanism, taken along the line A—A in FIG. 11.

As shown in FIGS. 4 and 6, the guide rail system 19 is suspended from a ceiling 21 of the second floor 3 of the building by suspension members 20. The bobbin carriage 30 can suspend a plurality of bobbin hangers 13 for transporting full packaged roving bobbins 10 or empty roving bobbins 10 between positions facing the respective lifting mechanism 15 and positions at which the roving bobbin exchanging operation between the bobbin carriage 30 and the respective ring spinning frames 11 is carried out. As shown in FIGS. 9, 10, and 12, each bobbin carriage 30a is composed of a plurality of carriage bars 30, which are connected in an aligned manner by a connecting member 35, respectively. Each carriage bar 30a is provided with a pair of supporting rods 31 projecting upwards, with a predetermined space therebetween. A supporting bar 32 is turnably mounted on each supporting rod 31 by a pivot shaft 32a, a pair of supporting rollers 33 are rotatably mounted on the pivot shaft 32a at the respective positions outside the supporting bar 32 (FIG. 12), and a pair of guide rollers 34 are rotatably mounted on a pair of shafts vertically projected downwards from the respective positions at both end portions of the supporting bar 32. A plurality of members (not shown) for actuating a non-contact limit switch are disposed on each carriage bar 30a such that the position of each member corresponds to the position of a bobbin hanger 13, and therefore the space between two adjacent members of the non-contacting switch is identical to the pitch between two adjacent bobbin hangers 13 of each carriage bar 30a. The above-mentioned member for actuating the non-contact limit switch is hereinafter referred to as an actuating member. Each carriage bar 30a is provided with a plurality of known bobbin hangers 13 for suspending roving bobbins 10 thereon in such a manner that the axial distance between two adjacent bobbin hangers 13 is identical to double the spindle pitch of the spindle alignment of the ring spinning frame 11.

To form a bobbin carriage 30, a connecting bar 35 is utilized to connect two carriage bars 30a through a pair of connecting shafts 35a at both end portions thereof, in such a manner that each carriage bar 30a can turn about the connecting shaft 35a, the axis of which coincides with the axis of a bobbin hanger 13 projected downward from the connecting end portion of the carriage bar 30a.

The length of each connecting bar 35 is selected to satisfy the condition that the axial distance between each two adjacent bobbin hangers 13 of the carriage bar 30 is identical, and the width of each connecting bar 35 is the same as the width of the carriage bar 30a. In this embodiment, each carriage bar 30a is provided with six bobbin hangers which includes two bobbins hangers 13 disposed at both portions connecting with the connecting members 35. Regarding the number of carriage bars 30a forming the bobbin carriage 30, in this embodiment, a plurality of bobbin hangers 13 is provided, the number of which is a half of the total number of bobbin wheels 9 of the roving frame 4, on the bobbin carriage 30; i.e., if there are 96 spindles on the roving frame 4, eight carriage bars 30a must be provided to form one bobbin carriage 30.

Figure 13:
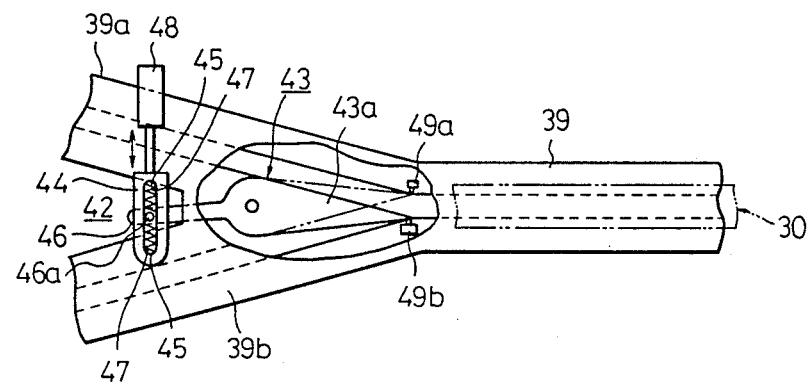
FIG. 13 is a plan view of a switching mechanism applied to the guide rails system shown in FIG. 6.

Next, the construction and function of the guide rail system 19 is explained in detail with reference to FIG. 6. The guide rail system 19 is composed of a main guide rail 38 and a plurality of branched guide rails 40 extended along the creel of the respective ring spinning frames 11, a receiving guide rail system 39 composed of receiving guide rails 39a, 39b, and a return guide rail 38a as shown FIG. 6. These rails all have an identical cross-sectional shape, i.e., the cross section of these guide rails has a shape of a rectangular frame, wherein a central portion of a bottom thereof is open, and a pair of guide walls 37, facing each other, are downwardly projected from the above-mentioned opened portion to form a pair of guide surfaces for guiding the guide roller 34, and a pair of guide surfaces 36 for guiding the respective supporting rollers 33 of each bobbin carriage 30 are provided by the inside surfaces positioned at both sides of the above-mentioned central aperture of the bottom portion of the cross section having the shape of a rectangular frame. As already explained, the guide rail system 19 is suspended from the ceiling 21 of the second floor 3, on which the ring spinning frames 11 are installed, by the suspension members 20. Each branched rail 40 is extended along the creel of the corresponding ring spinning frame, and a return rail 38 is provided. The receiving rail system 39 is divided into two guide rails, i.e., a first rail 39a and a second rail 39b, and these guide rails 39a, 39b are arranged in such a manner that their longitudinal center lines pass the respective transfer positions to reach corresponding positions whereat the vertical passages of the pegs 26 of the holding plates 25 pass through the corresponding above-mentioned longitudinal center lines of these guide rails 39a, 39b, respectively. On the other hand, each branch rail 40 is branched from the main guide rail 38 and then extended along the creel 12 of the ring spinning frame 11 at a position adjacent to and above the spindle alignment of the spinning frame 11. The return rail 38a is provided with a roving stripper 50, which removes any remaining roving from almost exhausted roving bobbins while these bobbins are being carried by the bobbin carriage 30. In the above-mentioned guide rail system 19, switching devices 43 are arranged on the guide rail system 19 at each branch point 42 whereat the above-mentioned receiving rails 39a, 39b, return rail 38a, and branched rails 40 are branched from the main guide rail 38. The constructions and functions of these switching devices 43 are identical, and thus only the switching device 43 disposed at the branch points 42 (FIG. 6) of the receiving rail system 39 will be explained. As shown in FIG. 13, a switch plate 43a is pivoted at a branch point 42 of the receiving rail system 39, and an operation lever 44 is provided with an elongated groove 45 wherein an engaging piece 46 of the switch plate 43a is engaged by an engaging pin 46a. The engaging pin 46a of the engaging piece 46 is resiliently held in the groove 45 by a pair of springs 47 disposed in the spaces in the elongated groove 45. The operation lever 44 is actuated by an air control cylinder 48 to position the switch plate 43a at the positions indicated by a solid line or an imaginary line. A pair of limit switches 49, 49a are disposed at this branched portion 42 of the receiving rail system 39 so that the position of the switch plate 43a can be detected. The switching device 43, each time the bobbin carriage 30 is moved into either the first rail 39a the second rail 39b, causes the air control cylinder 48 to be actuated so that the switch plate 43a assumes the required position. The action of the air control cylinders 48 of the switching devices 43 are all systematically controlled by a computer control system, to correctly transport the necessary bobbin carriage 30 onto the branch guide rail 40 facing a ring spinning frame 11 which requires a roving bobbin exchanging operation. Because the switching device 43 has the above-mentioned construction and function, when the switch plate 43a is in the position indicated by a solid line in FIG. 13, to be connected to the second rail 39b, the bobbin carriage 30, which is transported from the right-hand side in FIG. 13, cannot enter onto the second rail 39b from the branch point 42 until the position of the switch plate 43a is reversed. Nevertheless, when displacing the bobbin carriage 30 from the left-hand side in FIG. 13, even if the bobbin carriage 30 is displaced along the first rail 39a or along the second rail 39b, the bobbin carriage 30 can pass through this branch point 42 and enter onto the guide rail 39 downstream of the branch point 42, by a self-turning of the switch plate 43a against the resilient force of the springs 47.

Figure 11:
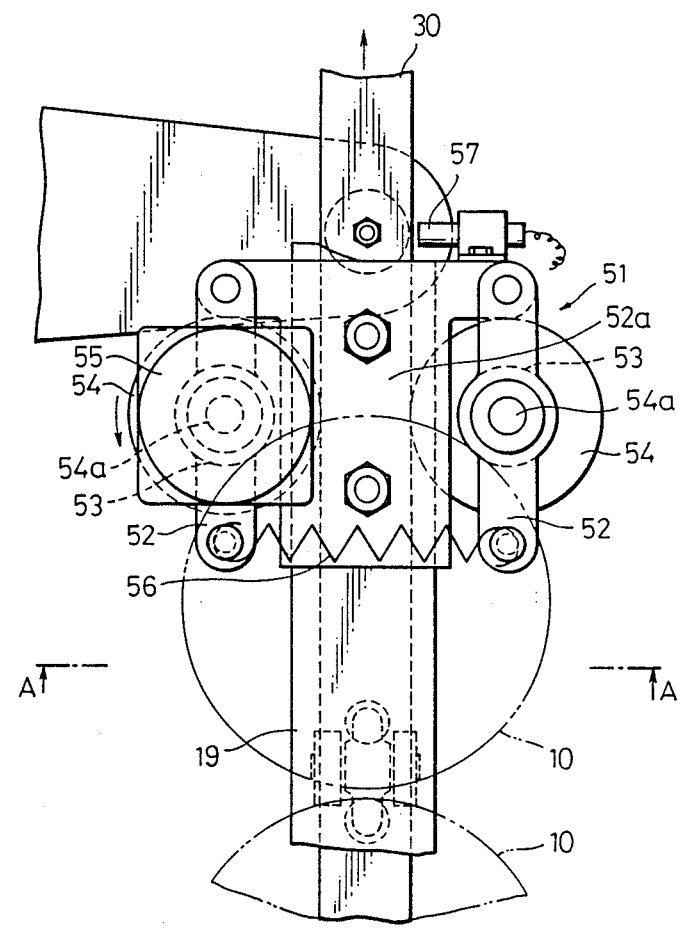
FIG. 11 is a plan view of a mechanism for displacing the bobbin carriage in relation to a guide rail, of the guide rails system shown in FIG. 6.

In the guide rail system 19, a plurality of feeding devices 51 are disposed along this system 19, with an identical interval between each adjacent feeding device 51, which interval is shorter than the length of the bobbin carriage 30. As shown in FIGS. 11 and 12, a pair of swing arms 52, provided with a bearing 53, are pivotally mounted on a bracket 52a secured to an upper surface of guide rails of the guide rail system 19, and a pair of rotation shafts 54a, to which a feed roller 54 is secured, are journalled to the respective bearings 53, and a drive motor 55, which can be driven in the normal drive direction and in the direction opposite to this normal driving direction, is arranged to drive one of the rotation shafts 54a. A tension spring 56 is connected to the end portions of these swing arms 52 so that when a bobbin carriage 30a (FIG. 12) is present between these feed rollers 54 while under pressure from the tension spring 56, the bobbin carriage 30a is displaced along the guide rail system 19 by the rotational action of the feed rollers 54. A non-contact limit switch 57 is mounted at each feeding device 51 to detect each passage of the bobbin hangers 13.

Although the device for transferring full packaged roving bobbins 10 from the belt conveyor 7 of the automatic doffing device 5 to the pegs 26 of each holding plate 25 of the chain conveyor 27 is not the characteristic element of the bobbin transporting apparatus of the present invention, to enable a better understanding of the characteristic feature of the present invention, the construction and function of the roving bobbin transferring device 58 is hereinafter explained. In this device, as shown in FIGS. 1, 7, and 8, a bracket 60 is secured to a base plate 59, a pair of pivot shafts 61, 62 are turnably mounted on the bracket 60, and horizontal gripping arms 63, 64 are secured to the upper end portions of the pivot shafts 61 and 62, respectively. A lifting cylinder 65 is mounted on the tip portion of these gripping arms 63, 64, and a bobbin gripping member 66, provided with four gripping fingers 67 which are actuated by an air control cylinder (not shown), is mounted on the piston rod of each lifting cylinder 65. With regard to the above-mentioned bobbin gripping member, several prior systems have been adopted, but in the above-mentioned embodiment of the present invention, the bobbin gripping member 66 disclosed in Japanese Unexamined Patent Publication Showa No. 58(1983)-41919 is utilized, and therefore, a detailed explanation of this bobbin gripping member 66 is omitted. In this embodiment, one of the pivot shafts 61, 62, i.e., the pivot shaft 61, is provided with an actuating arm 68 secured to the bottom end portion thereof, a piston rod of a cylinder 69 for creating a swing motion is connected to this actuating arm 68, and the gripping arms 63, 64 are pivotally connected to both end portions of a connecting rod 70 so that these gripping arms 63, 64 can turn simultaneously. Therefore, when the cylinder 69 is actuated, the gripping arms 63 and 64 swing between two positions indicated by a solid line and an imaginary line, respectively. Therefore, the gripping member 66 mounted on the gripping arm 64 moves from a position right above a front peg 6 on the belt conveyor 7, which is at a predetermined position, to a position right above a corresponding peg 26 of a holding plate 25, which also is at a predetermined position to receive a full packaged roving bobbin 10 of the chain conveyor 27, and vice versa, and the gripping member 66 of the gripping arm 63 moves from a position right above a back peg 6 on the belt conveyor 7, which is at a predetermined position, to a position right above a corresponding peg 26 of the above-mentioned holding plate 25, and vice versa.

As explained in the section entitled "Description of the Related Art", the applicant of this invention developed a unique apparatus and disclosed same in Japanese Unexamined Patent Publication Showa No. 61(1986)-201029. This apparatus is utilized in combination with an automatic doffing apparatus applied to a conventional roving frame as disclosed in U.S. Pat. No. 4,369,621. The above-mentioned automatic doffing apparatus is provided with a conveyor belt arranged at a position in front of a flyer alignment of a roving frame, whereon all doffed full packaged roving bobbins are temporarily held by the respective pegs disposed on the conveyor belt. After completion of the doffing operation by this automatic apparatus, all full packaged roving bobbin are displaced to a taking off place, which coincides with an end portion of the conveyor belt by turning the conveyor belt. Accordingly, the operation of the above-mentioned roving bobbin transporting apparatus is hereinafter explained in detail.

Before commencing the doffing operation for the roving frame 4, empty bobbins are mounted on alternative pegs 6 of the front row and the back row alignments of the pegs 6 arranged in zig-zag condition on the belt conveyor 7 of the automatic doffing apparatus 5. These fresh roving bobbins face the corresponding bobbin wheels 9 of the roving frame 4. The mounting operation of the fresh roving bobbins on these pegs 6 will be explained later, in relation to the transporting of these roving bobbins from the ring spinning frame to the roving frames.

In this embodiment, the longitudinal center lines of guide rails 39a, 39b are perpendicular to the direction of alignment of pegs 26 of each holding plate 25, and the space between these longitudinal center lines is identical to the axial distance between the pegs 26 of each holding plate 25.

When the full packaged roving bobbins are transferred from the belt conveyor 7 of the automatic doffing apparatus 5 of a roving frame 4 to a position for carrying out the roving bobbin exchanging operation before a ring spinning frame, the holding plate, hereinafter particularly referred to as the holding plate 25A (FIGS. 2, 3), of the chain conveyor 27 of the lifting mechanism 15, which comes to a lowermost position facing the roving frame 4, is at a position for carrying out the roving bobbin transfer operation from the belt conveyor 7 of the automatic doffing apparatus 5 to the pegs 6 of the holding plate 25A. As already mentioned, the chain conveyor 27 can be driven in a normal direction and in a direction opposite to the normal direction, but, in the following explanation and as shown in the attached drawings, it is specified that the counter-clockwise drive of the chain conveyor 27 is called the normal direction and the clockwise drive thereof is called the opposite direction.

As disclosed in the prior art, U.S. Pat. No. 4,369,621, when the roving bobbins of the roving frame 4 become full, the roving frame 4 is stopped and the automatic doffing apparatus 5 is actuated so that all full packaged roving bobbins 10 are simultaneously taken from the respective bobbin wheels of the roving frame 4 by a bobbin transferring head 8 and temporarily mounted on the respective pegs 6, which are not holding empty roving bobbins, of the belt conveyor 7, then all empty roving bobbins are simultaneously taken from the pegs 6 of the belt conveyor 7 by the bobbin transferring head 8, which then mounts those empty roving bobbins on the respective bobbin wheels 9 of the roving frame 4, simultaneously, and thereafter, the spinning operation of the roving frame 4 is started. Upon completion of the above-mentioned automatic doffing operation, the belt conveyor 7 is driven to displace the pegs 6 toward the right-hand direction in these drawings, and when the roving bobbins 10 mounted on a front row peg 6 and a back row peg 6, which are located at the right-side end of the alignments of the front row pegs 6 and the back row pegs 6 on the belt conveyor 7, arrive at the respective positions immediately below the corresponding bobbin gripping members 66, mounted on corresponding gripping arms 63, 64 of an automatic roving bobbin transfer apparatus 58, the belt conveyor 7 is stopped.

Figure 2:
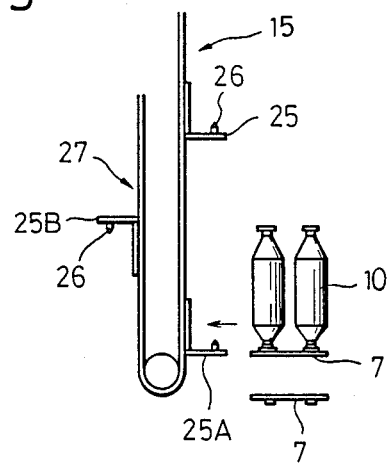
FIGS. 2 and 3 are explanatory drawings indicating the function of a chain conveyor of a lifting mechanism, which is an elementary member of the apparatus shown in FIG. 1.
Figure 3:
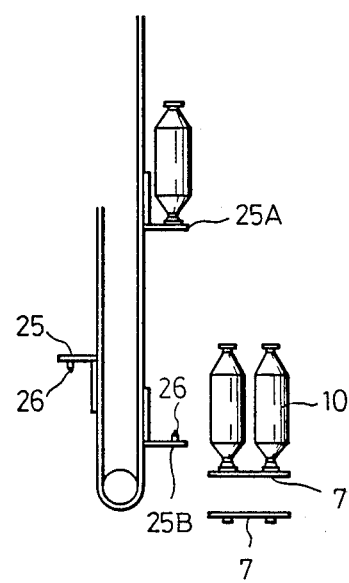

Next, the respective cylinders 65 of the gripping arms 63, 64 are actuated to displace the respective gripping members 66 to the respective positions where each gripping member 66 can grip the full packaged roving bobbin 10 facing thereto, and thereafter, these gripping members are simultaneously actuated so that gripping fingers 67 thereof catch and grip the full packaged roving bobbin 10 opposite thereto. Then the gripping members are simultaneously elevated so that these full packaged roving bobbins 10 are taken from the pegs 6 of the belt conveyor 7, and then the swing cylinder 69 is actuated so that the gripping arms 63, 64 are turned from a position represented by a solid line to another position represented by a dash-dotted line, and the full packaged roving bobbins 10, held by the respective gripping members 66, are displaced to the respective positions immediately above the corresponding pegs 6 of the holding plate 25A of the chain conveyor 27 of the lifting mechanism 15, as shown in FIG. 2. At this point, the cylinders 65 of each of the gripping members 66 are actuated, the gripping members 66 are displaced downward to positions such that each full packaged roving bobbins 10 held by the gripping member 66 touches the holding plate 25A, then the grip of the roving bobbins 10 by the respective gripping members 64 is released, and thereafter, the gripping members 66 are displaced upward so that the full packaged roving bobbins 10 are transferred to the corresponding pegs 6 of the holding plate 25A. Thereafter, the gripping arms 63, 64 are returned to the standby position, represented by a solid line in FIG. 8.

When the first transfer operation of roving bobbins 10 to the pegs 26 of the holding plate 25A is completed as mentioned above, the belt conveyor 7 of the automatic doffing apparatus 5 is driven to displace the pegs 6 toward the roving bobbin transfer apparatus for one pitch of the alignment of pegs 6 on the belt conveyor 7, so that the next pair of full packaged roving bobbins 10 mounted on the next pegs 6 of the rear and back rows are positioned at the respective positions immediately below the corresponding bobbin gripping members 66 of the gripping arms 63, 64, respectively. On the other hand, the chain conveyor 27 of the lifting mechanism 15 is driven in the normal direction to lift each holding plate 25 for one pitch, by an actuating signal from a detector such as a limit switch (not shown) which detects that the gripping arms 63, 64 have returned to the standby positions, and when the holding plate 25A at which the roving bobbin transfer operation from the apparatus 58 has been completed, and the holding plate 25 mounted on the chain conveyor 27 at an adjacent position downstream of the holding plate 25A, which is hereinafter referred to as holding plate 25B, arrive at the respective positions shown in FIG. 3, a detector 29 (FIG. 1) detects the arrival of the holding plate 25 at the transfer position located at the upper end portion of the chain conveyor 27, and then the drive of the chain conveyor 27 is stopped. Next, the chain conveyor 27 is driven in the opposite direction, by a delayed signal issued from the detector 29, and when the detector 28 detects that the holding plate 25B has arrived at a predetermined position for carrying out the roving bobbin transfer operation from the apparatus 58 to the holding plate 25B, the above-mentioned opposite drive motion of the chain conveyor 27 is stopped. The above-mentioned motion of the chain conveyor 27 in relation to the motion of the transfer apparatus 58, which is a unit cycle motion of the chain conveyor 27, is stepwisely repeated, so that the full packaged roving bobbins 10 mounted on the pegs 26 of the holding plates 25 are stepwisely displaced upward towards the bobbin carriage 30 positioned at the respective transfer positions on the guide rails 39a, 39b.

In the above-mentioned stepwise operation, upon completion of each unit cycle driving motion of the chain conveyor 27, each holding plate 25 having a pair of full packaged roving bobbins mounted thereon is displaced upward toward the above-mentioned bobbin carriages 30 by a distance (a)-(b), wherein (a) represents a distance of upward displacement of each holding plate 25 in a period between a time of the commencing of the drive of the chain conveyor 27 in the normal direction, by a signal issued from a detector which confirms the completion of a unit transfer motion of a pair of full packaged roving bobbins on a holding plate 25 from the down belt conveyor 7 of the automatic doffing apparatus 5, and when this drive of the chain conveyor 27 to the normal direction is stopped by the signal issued from the detector 29, when the detector 29 detects the arrival of a holding plate 25 at the above-mentioned transfer position thereof, and (b) represents a distance of downwards displacement of each holding plate 25 in a period between a time of the commencing of the opposite drive of the chain conveyor 27 and a time of stopping this opposite drive of the chain conveyor 27 by the signal issued from the detector 28 when the detector 28 detects the arrival of a holding plate 28 located at the lowermost position, where the transfer operation of full packaged roving bobbins 10 from the conveyor belt 5 to this holding plate 25 is carried out, for the next cycle of driving the chain conveyor 27.

When each holding plate 25 holding full packaged roving bobbins 10 arrives at the above-mentioned transfer position thereof, since the axial center line of each peg 26 of the holding plate 25 coincides with the axial center line of the corresponding bobbin hanger 13 of the corresponding one of the bobbin carriages 30 positioned at the transfer positions on the respective guide rails 39a, 39b, these bobbin hangers 13 are inserted into the corresponding full packaged roving bobbins of this holding plate 25, and these full packaged roving bobbins 10 are separated from the respective pegs 26 of the holding plate 25 by the downwards displacement of the distance (b), and accordingly, these full packaged roving bobbins 10 are transferred to the above-mentioned bobbin hangers 13, respectively.

In this embodiment, the arrangement distance of the holding plates 10 on the chain conveyor 27, i.e., the arrangement pitch of the holding plates 25, is designed to satisfy a condition such that each holding plate 25 will be brought to the above-mentioned transfer position by the normal drive of the chain conveyor 27 in the sixth cycle of operation after the completion of the transfer of the full packaged roving bobbins 10 from the conveyor belt 5 of the automatic doffing apparatus 4, on a holding plate 25 located at the above-mentioned lowermost position thereof.

As mentioned above, when the unit operation of the normal and opposite drive of the chain conveyor 27 is stepwisely and sequentially repeated six times, the first bobbin hangers 13 positioned at the respective receiving positions in the above-mentioned transfer positions of the respective bobbin carriages 30 on the guide rails 39a, 39b are inserted into the corresponding full packaged roving bobbins 10 mounted on the holding plate 25 which were brought to the above-mentioned transfer position on the chain conveyor 27 by the normal drive thereof, and when the chain conveyor 27 is driven in the opposite direction in this six-cycle drive operation, the full packaged roving bobbins 10 are completely transferred to the respective bobbin hangers 13 of the bobbin carriages 30 from the above-mentioned holding plate 25. Each time the full packaged roving bobbins 10 are transferred from the holding plates 25 to the corresponding bobbin hangers 13 of the bobbin carriages 30, the drive motor 55 of the feeding device 51 (FIGS. 11, 12) is actuated so that the bobbin carriages 30 are displaced in the downstream direction (right-hand side in FIG. 1) along the receiving rail system 39, and when the limit switch 57 (FIG. 12) detects the arrival of the next bobbin hanger 13, the motor 55 is stopped. According to the above-mentioned drive of the motor 55, the bobbin carriages are simultaneously displaced in the downward direction along the receiving guide rail system 39, one pitch by one pitch of the bobbin hanger arrangement in the bobbin carriages 30. When the operation for transferring full packaged roving bobbins 10 to all bobbin hangers 13 of two bobbin carriages 30 is completed, a detector (not shown) detects this condition and stops the drive of the chain conveyor 27 and the motion of the transferring apparatus 58 by a signal output from this detector, and then the feeding devices 51 attached to the first rail 39a and the second rail 39b are driven and the bobbin carriages 30 positioned at the transfer positions on the guide rail 39a, 39b are displaced to the main rail 38 of the guide rail system 19, stepwisely, for example, in the order whereby the bobbin carriage 30 on the first rail 39a is first displaced and then the bobbin carriage 30 on the second rail 39b is displaced, or vice versa. Since the switching device 43 is provided with a particular construction and function as already explained, the bobbin carriage 30 on the guide rails 39a, 39b, which is connected to the main guide rail 38, can be displaced without resistance by the switching plate 43a of the device 43, the bobbin carriage 30 on the guide rails 39a, 39b, the connection of which to the main guide rail 38 is closed, is forced to pass through the device 43 towards the main rail 38, by turning the switching plate 43a against the resilient force of the spring 47. As previously mentioned, a plurality of feeding devices 51 are disposed on the constitutional guide rails of the guide rail system 19, at an identical interval which is shorter than the length of the bobbin carriage 30, and each feeding device 51 is provided with a non-contacting limit switch 57 which detects the passing of each carriage bar 30, and accordingly, when one of the non-contacting limit switches 57 detects the passing of a carriage bar 30, this limit switch 57 issues a signal to actuate the feeding device 51 located at the next downstream position on the guide rail system 19, and issues a signal to stop the feeding device 51 which the bobbin carriage 30 has passed. By displacing the bobbin carriage 30 by the feeding devices 51 as mentioned above, the bobbin carriages 30 can be displaced onto the branch guide rail 40 in front of the ring spinning frame 11 which requires a roving bobbin exchanging operation.

Figure 14:
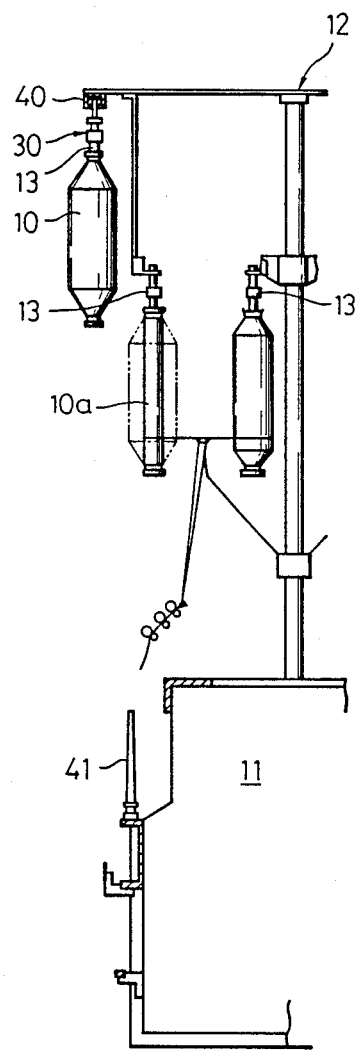
FIG. 14 is a schematic side view of the ring spinning frame to which the present invention is applied.

On the floor 3 where the ring spinning frames 11 are installed, if an exchange of the almost exhausted roving bobbins for full packaged roving bobbins, on a creel 12 of one spindle side is needed, at one of the ring spinning frames 11, the switching device 43, disposed at the branch point 42 of the guide rail 40 extending along the creel 12, on the main guide rail 38 is actuated to displace the bobbin carriage(s) 30 onto the guide rail 40 concerned. Therefore, when the bobbin carriages 30 displaced along the main guide rail 38 reach this branch point 42, the bobbin carriages 30 are displaced onto the guide rail 40, and when the bobbin carriages 30 arrive at the respective supply positions along the guide rail 40, the full packaged roving bobbins 10 suspended from the respective bobbin hangers 13 of the bobbin carriage 30 take respective positions in front of the corresponding front bobbin hangers 13 of the creel 12 of the ring spinning frame 11, as shown in FIG. 14, and in this condition, the motion of the feeding device 51 is stopped. Thereafter, these full packaged roving bobbins 10 are automatically exchanged for the almost exhausted roving bobbins 10a suspended by the front bobbin hangers 13 of the creel 12 of the ring spinning frame 11, for example, by the automatic roving bobbin exchanging apparatus disclosed in Japanese Unexamined Patent Publication, Showa No. 60 (1985)-71724 or Japanese Unexamined Patent Publication, Showa No. 62 (1987)-53425. When exchanging almost exhausted roving bobbins suspended by bobbin hangers 13 of the front and back rows of the creel 12, the roving bobbin exchanging operation can be carried out by a known automatic apparatus such as disclosed in Japanese Unexamined Patent Publication, Showa No. 61 (1986)-102428 or Japanese Unexamined Patent Publication, Showa No. 61 (1986)-119728.

When the exhausted roving bobbins 10a received by the bobbin hangers 13 of the bobbin carriage 30 from the ring spinning frame 11 by the above-mentioned roving bobbin exchanging operation are returned to the first floor 2 whereat the roving frame 4 are installed, a roving stripper (not shown) is disposed on the return passage of the guide rail system 19 so that remaining rovings of all of the roving bobbins passing through are removed by the roving stripper. Thereafter, these roving bobbins (empty roving bobbins) are returned to the automatic doffing apparatus of each roving frame 4. The above-mentioned return operation of the empty roving bobbins to the automatic doffing apparatus 5 of each roving frame 4 is hereinafter explained in more detail. As mentioned above, after the exhausted roving bobbins 10a are treated by the roving stripper, the bobbin carriages 30 suspending empty roving bobbins 10a are displaced onto the guide rail 39a and the guide rail 39b through the main rail 38 by operating the switching devices 43, respectively. When the first bobbin hanger 13 of the bobbin hanger alignment in the bobbin carriage 30 arrives at a position whereat the axial line of the bobbin hanger 13 coincides with the axial line of the corresponding peg 6 of a holding plate 25, when this holding plate 25 reaches the transfer position of the chain conveyor 27, the bobbin carriage 30 is stopped so that the other bobbin hangers 13 follow this first bobbin hanger 13 (at the right side in FIG. 1). When the bobbin carriage 30 is stopped as mentioned above, the drive motor of the chain conveyor 27 is driven in the normal direction by a signal output from the non-contact limit switch (not shown), which detects the arrival of each of the first bobbin hangers 13 of the bobbin carriages 30 at the respective transfer positions thereof on the guide rails 39a, 39b, and when an upwards displacing motion of the holding plates 25 by the normal drive of the chain conveyor 27 is stopped by the signal output from the detector 29, the insertion of the pegs 26 of the holding plate 25, the arrival of which has been detected, into the respective empty roving bobbins 10a suspended by the respective first bobbin hangers 13 of the bobbin carriages 30, from the bottom side thereof, is completed. Thereafter, these empty roving bobbins 10a are separated from the first bobbin hangers 13 of the bobbin carriages 30 by the downward displacing motion of the holding plates 25 caused by the opposite drive motion of the chain conveyor 27, which is actuated by driving the drive motor of the chain conveyor 27 to reverse the direction thereof, when receiving a signal from the detector 29. When the detector 28 detects the arrival of a holding plate 25 located at the lowermost position on the chain conveyor 27, the above-mentioned opposite drive of the chain conveyor is stopped by a signal from the detector 28. The above-mentioned unit cycle operation of driving the chain conveyor 27 is stepwisely repeated. When the empty roving bobbins 10a are transferred from the first bobbin hanger 13 of each bobbin carriage 30 to the corresponding pegs 26 of the holding plate 25, as mentioned above, each bobbin carriage 30 is displaced by one pitch of the bobbin hanger alignment, in the upstream direction, so that the second bobbin hangers 13 of each bobbin carriage reach a position for carrying out the roving bobbin transfer operation therefrom to the holding plate 25, and thereafter, the above-mentioned empty roving bobbin transfer operation from the bobbin hangers 13 of the bobbin carriages 30 to the second holding plate 25 is carried out.

In the above-mentioned empty roving bobbin transfer operation, in each unit cycle of driving the chain conveyor 27, each holding plate 25 is first displaced upwards by the lifting mechanism 15 by a distance (c) which is identical to the distance (b) of the downwards displacement of the holding plate 25 during the unit transporting operation of the full packaged roving bobbins 10, and each holding plate 25 is then displaced downwards by a distance (d) which is identical to the distance (a) of the upwards displacement during the unit transporting operation of the full packaged roving bobbins 10. Accordingly, each holding plate 25 is displaced downwards by a distance [(d)−(c)] by each cycle operation of the chain conveyor 27. After a predetermined number of unit cycle operations (in this embodiment, six unit operations) the first holding plate 25, which first receives empty roving bobbins 10a from the first bobbin hangers 13 of the bobbin carriages 30, arrives at the lowermost position of the chain conveyor at the side of automatic roving bobbin transfer apparatus 58. In this condition, this holding plate 25 is at a position at which the empty roving bobbin transfer operation by the apparatus 58 can be carried out. In this condition, the empty roving bobbins 10a, which are held by the respective pegs 26 of the holding plate 25, are mechanically transferred to the corresponding pegs 6 of the belt conveyor 7, by the apparatus 58, and then the above-mentioned empty roving bobbin transferring operation is stepwisely repeated until the necessary number of empty roving bobbins 13 are transferred from the bobbin carriage 30 to the belt conveyor 7.

In the above-mentioned embodiment, a pair of full packaged roving bobbins 10 are simultaneously transferred from a holding plate 25 to bobbin hangers 13 of two bobbin carriages 30 positioned on the first rail 39a and the second rail 39b, and a pair of empty roving bobbins 10a are simultaneously transferred from the bobbin hangers 13 of bobbin carriages 30 to the holding plate 25. But, instead of utilizing two bobbin carriages 30 for one roving bobbin transferring operation, it is possible to use a single bobbin carriage 30 disposed in such a manner that the receiving guide rail system 39 is composed of a single guide rail which is arranged perpendicular to the above-mentioned receiving guide rail system 39 so that the two adjacent bobbin hangers 13 in the bobbin carriage 30 can be at the respective positions where the axial center of the bobbin hanger 13 coincides with the axial center of the corresponding peg 6 of the holding plate 25 when this plate 25 is at the transfer position of the chain conveyor 27 for carrying out the roving bobbin transfer operation.

In the drawing showing the embodiment of the present invention, the guide rail system 19, particularly, the main guide rail 38, is partly disclosed only for the purpose of explanation. Nevertheless, in practice, it is necessary to consider several types of buildings and the installations of the roving frames and spinning frames in the factory. Therefore, the guide rail system 19 for carrying the bobbin carriages 30 must include complex curved shapes of the guide rail. But, since the bobbin carriage 30 shown in the above-mentioned embodiment has a joint type construction as mentioned above, such a bobbin carriage 30 can be utilized very smoothly in practice. Several modifications of the bobbin carriage 30, carriage bar 30a, the switching device 43 and displacing device 58 can be accepted if such modifications satisfy the functional condition thereof explained in the above-mentioned embodiment.

If the present invention is applied to a spinning factory utilizing several floors of a building, i.e., more than two floors, the present invention can be satisfactory applied by utilizing the lifting mechanism provided with the elongated chain conveyor, to cover all floors. On the other hand, if the present invention is applied to a spinning factory utilizing one floor of a building, where the roving frames and the ring spinning frames are installed, the present invention can be also satisfactory utilized by arranging the guide rail system on the ceiling of the same floor.

As explained in the above-mentioned paragraphs in detail, since the full packaged roving bobbins doffed from the roving frames can be mechanically transported from the doffed position of the roving bobbin to the position where the roving bobbin exchanging operation is carried out on the floor of the ring spinning frame, by the lifting mechanism and mechanical system of transporting bobbin carriages, without utilizing a manually operable carrying machine, possible damage to the full packaged roving bobbins during the transporting operation can be completely prevented, and further, the labor cost of manually handling the roving bobbin transporting and exchange operation can be eliminated. Since, in the present invention, by utilizing a lifting device having a plurality of holding plates, an effective system of displacing the bobbin carriages in cooperation with the guide rail system is adopted, the roving bobbin transporting operation between the floor on which roving frames are installed and the places for carrying out the roving bobbin exchanging operation on the floor on which the ring spinning frame is installed can be carried out rapidly and effectively, while preventing possible damage to the rovings during transportation. Further, labor costs for manually transporting the roving bobbins between the roving frames and the ring spinning frames can be remarkably reduced whereby, the present invention contributes to a rationalization of a modern spinning factory. Further, in such a particular case where several floors of a building are utilized as a spinning factory, wherein the roving frames are installed on a floor separate from the floor whereat the ring spinning frames are installed, the guide rails for the bobbin carriages arranged in the ceiling of the floor where the roving frames become unnecessary, since a lifting mechanism for each roving frame can be installed such that the lifting mechanism extends to a position adjacent to and below the guide rail system arranged in the ceiling of the upper floor where the ring spinning frames are installed, by passing through a small opened space formed in the floor at which the ring spinning process is carried out, and therefore, it is clear that the cost for adopting this apparatus, even when adapting a building now in use, can be remarkably reduced, and thus the cost of adopting the apparatus of the present, invention is reduced, further contributing to the creation of a modern spinning factory.

We claim:

1. A method for transporting a plurality of roving bobbins between a floor at which a plurality of roving frames are installed and places for carrying out a roving bobbin exchanging operation before ring spinning frames installed on another floor, said method being applied in a spinning factory wherein roving frames and ring spinning frames are installed on different floors respectively, and bobbin carriages provided with a plurality of bobbin hangers can be transported to said places for carrying out said roving bobbin exchanging operation by means of a guide rail system arranged on a ceiling of said floor on which said ring spinning frames are installed, comprising the steps of:

forming a transporting passage for transporting roving bobbins from specified positions on said floor on which said roving frames are installed to corresponding positions for transferring roving bobbins on said guide rail system, transporting a plurality of full packaged roving bobbins doffed from roving frames from said transferring positions to said places for carrying out said roving bobbin exchanging operation by displacing said bobbin carriages along said guide rail system, after completion of an operation of transferring full packaged roving bobbins doffed from said roving frames, by displacing said full packaged roving bobbins through said transporting passage, transporting a plurality of empty roving bobbins created by said roving bobbin exchanging operation from a place whereat said operation was carried out to a desired transferring position by displacing said bobbin carriages along said guide rail system, and then transferring said empty roving bobbins from said bobbin hangers of said bobbin carriages carried to said floor on which said roving frames are installed by transporting said empty roving bobbins taken from respective bobbin hangers of said bobbin carriages carried to said transfer position through said transporting passage, said transportation of said full packaged roving bobbins through said transportation passage comprising sequential stepwise unit lifting operations of lifting a plurality of pairs of full packaged roving bobbins towards corresponding transfer positions on said guide rail system from corresponding specified positions, with a predetermined identical interval (a) between adjacent pairs of full packaged roving bobbins being longer than a length of said roving bobbin, while maintaining a constant axial distance between each pair of full packaged roving bobbins, said transportation of empty roving bobbins through said transportation passage downwards comprising sequential stepwise unit operations of displacing said empty roving bobbins downwards, with an interval identical to said interval of said upward transportation of full package roving bobbins, with an axial interval of said pair of empty bobbins being identical to said axial interval of said pair of full packaged roving bobbins during said upward transportation of full packaged roving bobbins.

2. A roving bobbin transporting method according to claim 1, wherein said method of maintaining said axial distance between two full packaged roving bobbins while passing through said transporting passage is attained by utilizing a pair of pegs having a fixed axial distance therebetween for temporarily holding respective ones of said full packaged roving bobbins during passage through said transporting passage.

3. A roving bobbin transporting method according to claim 2, wherein said unit lifting motion of said pair of full packaged roving bobbins is composed of a combination of an upwards displacing motion of said pegs towards said transfer position on said guide rail system for a predetermined distance (b) and a successive downwards displacing motion of said pegs for a predetermined small distance (c), so that said upward displacing distance by said unit lifting operation becomes (b-c), and upon completion of each unit lifting operation of said pegs, said pair of full packaged roving bobbins held by respective ones of said pegs arriving at an uppermost position facing said transfer position on said guide rail system are transferred to corresponding bobbin hangers of said bobbin carriage positioned at said transfer position on said guide rail system, and said unit downwards displacing motion of said pair of empty roving bobbins is composed of an upwards displacing motion of said pegs towards said transfer position on said guide rail system for a small distance (c) and a successive downwards displacing motion of said pegs for a predetermined distance (b), so that said downwards displacing distance by said unit downwards displacing operation becomes (b−c), and upon completion of each unit downwards displacing operation of said pegs, a pair of said empty roving bobbins held by respective bobbin hangers of said bobbin carriage positioned at said transfer position on said guide rail system are transferred to respective ones of said pegs at an uppermost position facing said transfer position of said guide rail system.

4. A roving bobbin transporting method according to claim 2, wherein said guide rail system is provided with a main guide rail and a pair of branched guide rails branched from said main guide rail in a parallel condition with a distance between longitudinal center lines of said branched guide rails, for providing said transferring positions to form said transporting passages, equal to an axial distance between said pair of pegs for transporting roving bobbins, pair by pair, through said transporting passage, and at each transferring position, a trace of an alignment line of said pair of pegs approaching thereto perpendicularly crosses said longitudinal center lines of said branched guide rails.

5. A roving bobbin transporting method according to claim 4, wherein when all full packaged roving bobbins are doffed from a roving frame by said automatic doffing apparatus, all doffed full packaged roving bobbins are taken from said automatic doffing apparatus by said taking device, pair by pair, from an end of said doffing apparatus, while transporting said full packaged roving bobbins, pair by pair, in cooperation with said taking operation through said transporting passage towards said transferring positions of said branched guide rails, upon completion of said transfer operation of said full packaged roving bobbins from said automatic doffing apparatus through said taking device to said bobbin carriages positioned at respective transfer positions of said branched guide rails, said two bobbin carriages being transported to respective positions adjacent to one of said ring spinning frames which requires a roving bobbin exchanging operation.

6. A roving bobbin transporting method according to claim 2, wherein said guide rail system is provided with a main guide rail and a branched guide rail branched from said main guide rail for providing said transferring positions to form said transferring passage, and at each transferring position, a moving trace of alignment line of an said pair of pegs through said transporting passage is parallel to a center line of said branch guide rail, and an axial distance between two adjacent bobbin hangers of said bobbin carriages is equal to an axial distance between said pair of pegs.

7. A roving bobbin transporting method according to claim 1, wherein each of said roving frames is provided with an automatic doffing apparatus and a device for taking full packaged roving bobbins, pair by pair, stepwisely from a side end of said automatic doffing apparatus, said specified position being selected to cooperate with said device for taking full packaged roving bobbins of each roving frame so that said transporting passage is formed at a position adjacent to each roving frame.

8. A roving bobbin transporting method according to claim 1, wherein said transporting passage is utilized as a common passage for a plurality of roving frames.

9. An apparatus for transporting a plurality of roving bobbins between a floor at which a plurality of roving frames are installed and places for carrying out a roving bobbin exchange operation before ring spinning frames installed on another floor, said apparatus being applied in a spinning factory wherein roving frames and ring spinning frames are installed on different floors respectively, and bobbin carriages provided with a plurality of bobbin hangers, aligned with an identical pitch, can be transported to said places for carrying out said roving bobbin exchanging operation by means of a guide rail system arranged on a ceiling of said floor on which said ring spinning frames are installed, comprising, at least one lifting means for stepwisely displacing of pairs of pegs, which are capable of temporarily holding roving bobbins respectively, between specified positions on said floor wherein a plurality of roving frames are installed and said guide rail system of said floor wherein a plurality of ring spinning frames are installed, at least one guide rail of said guide rail system, provided with first transfer positions for carrying out a transfer operation of said roving bobbins from said pegs to corresponding bobbin hangers of said bobbin carriage positioned thereat, and vice versa, each of said lifting means being provided with a second transfer position adjacent to a lower end portion thereof.

10. An apparatus for transporting a plurality of roving bobbins according to claim 9, wherein
each of said lifting means comprising:
an outside frame connected between each of said specified positions on said floor of roving frames and one of said first transfer positions of said guide rail, wherein a hollow space for forming a passage for displacing roving bobbins is formed, an endless chain conveyor provided with a plurality of holding plates with a predetermined identical pitch therebetween, each holding plate being provided with a pair of said pegs rigidly mounted thereon in a horizontal condition during upwards and downwards displacement in said passage formed in said outside frame, means for controlling the sequential stepwise unit displacing motion of said conveyor belt for carrying out the transfer operation of roving bobbins, pair by pair, between each of said holding plates and corresponding bobbin hangers of said bobbin carriage, between said specified position of said floor of roving frames and each of said holding plates.

11. An apparatus for transporting a plurality of roving bobbins according to claim 10, wherein said chain conveyor comprises
a horizontal driving shaft secured to said driving shaft, a horizontal shaft disposed at the upper end portion thereof, a driven chain wheel rotatably mounted on said upper horizontal shaft, an endless chain conveyor mounted on said driven chain wheel and
a motor driving said driving shaft.

12. An apparatus for transporting a plurality of roving bobbins according to claim 11, wherein said control means comprises:
a first detector for detecting a completion of mounting a pair of full packaged roving bobbins on said holding plate at said second transfer position thereof, a second detector disposed at a position adjacent to an upper end portion of said chain conveyor for detecting a position of said holding plate in facing condition to said first transfer position of said bobbin carriage on said guide rail, a third detector disposed at a position adjacent to a lower end portion of said chain conveyor, and a fourth detector for detecting the arrangement of said bobbin hangers at said first transfer position of said bobbin carriage, said first detector being provided with a function of issuing a signal to drive said chain conveyor belt in a normal direction to displace said holding plates upward, said second detector being provided with a function of detecting the arrival of said holding plate at the uppermost position thereof and issuing a signal to drive said chain conveyor in an opposite direction, said third detector being provided with a function of detecting the arrival of said holding plate when said holding plate is displaced downward in a unit cycle of a drive motion of said chain conveyor and issuing a signal to stop the drive of said chain conveyor, and said fourth detector being provided with a function of issuing a signal to drive said chain conveyor in a normal direction;
wherein said pitch between two adjacent holding plates is selected to satisfy the condition that, in the respective operations for transferring full packaged roving bobbins and empty roving bobbins, an engagement between each roving bobbin and a corresponding peg, and between each roving bobbin can be effectively carried out by creating a slight engagement therebetween by the combined displacing motions controlled by said first, second, and third detectors, and by said second, third, and fourth, detectors, respectively.

13. A roving bobbin transporting method according to claim 10, wherein said guide rail system is provided with a main guide rail and a pair of branched guide rails branched from said main guide rail in a parallel condition with a distance between longitudinal center lines of said branched guide rails being equal to an axial distance between said pair of pegs of each holding plate, said branched guide rails being arranged such that, at each transferring position, each of said branched guide rails takes a position whereat said longitudinal center line thereof perpendicularly crosses a motion trace of an alignment line of said pair of pegs of said holding plates.

14. A roving bobbin transporting method according claim 10, wherein said guide rail system is provided with a main guide rail and a branched guide rail branched from said main guide rail for providing said transferring positions connecting corresponding lifting means, and at each transferring position, a moving trace of alignment of said pair of pegs through said transporting passage is parallel to a center line of said branch guide rail, and an axial distance between two adjacent bobbin hangers of said bobbin carriages is equal to an axial distance between said pair of pegs.

15. An apparatus for transporting a plurality of roving bobbins according to claim 9, wherein each of said roving frames is provided with an automatic doffing apparatus for simultaneously doffing all full packaged roving bobbins therefrom, said doffing apparatus being provided with a conveyor belt disposed at a position along the flyer alignment of said roving frame for receiving said full packaged roving bobbins and holding empty bobbins, and a transfer device for transferring roving bobbins, pair by pair, between said chain conveyor and said holding plate positioned at said second transfer position of said lifting means.

* * * * *